United States Patent
Gownder et al.

(10) Patent No.: US 6,758,994 B2
(45) Date of Patent: Jul. 6, 2004

(54) METHOD OF PRODUCING POLYPROPYLENE TAPES

(75) Inventors: Mohan Gownder, Midland, TX (US); George R. Rowland, Jr., Sea Brook, TX (US); David Keith Young, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 216 days.

(21) Appl. No.: 10/112,141

(22) Filed: Mar. 28, 2002

(65) Prior Publication Data

US 2003/0183975 A1 Oct. 2, 2003

(51) Int. Cl.[7] .................. B29B 11/10; B29C 47/00; B29C 55/00
(52) U.S. Cl. .............. 264/146; 264/160; 264/210.1; 264/211.12; 264/288.4; 264/291; 264/294
(58) Field of Search .................. 264/146, 160, 264/210.1, 211.12, 288.4, 291, 294

(56) References Cited

U.S. PATENT DOCUMENTS

| | | |
|---|---|---|
| 3,258,455 A | 6/1966 | Natta et al. |
| 3,305,538 A | 2/1967 | Natta et al. |
| 4,298,718 A | 11/1981 | Mayr et al. |
| 4,560,734 A | 12/1985 | Fujishita et al. |
| 4,701,432 A | 10/1987 | Welborn, Jr. |
| 4,758,396 A * | 7/1988 | Crass et al. .................. 264/145 |
| 4,794,096 A | 12/1988 | Ewen |
| 4,808,561 A | 2/1989 | Welborn, Jr. |
| 4,892,851 A | 1/1990 | Ewen et al. |
| 4,975,403 A | 12/1990 | Ewen |
| 5,243,002 A | 9/1993 | Razavi |
| 5,272,003 A | 12/1993 | Peacock |
| 5,308,811 A | 5/1994 | Suga et al. |
| 5,444,134 A | 8/1995 | Matsumoto |
| 5,807,800 A | 9/1998 | Shamshoum et al. |
| 5,908,594 A * | 6/1999 | Gownder et al. ......... 264/210.7 |
| 6,416,699 B1 * | 7/2002 | Gownder et al. ......... 264/210.8 |

OTHER PUBLICATIONS

Kirk–Othmer, Encyclopedia of Chemical Technology, Third Edition, vol. 23, pp. 615–627.

* cited by examiner

Primary Examiner—Stephen J. Lechert, Jr.
(74) Attorney, Agent, or Firm—William D. Jackson

(57) ABSTRACT

The present invention relates to a process for making polymer tapes utilizing metallocene catalysts. An isotactic propylene polymer is prepared by polymerizing propylene in the presence of an isospecific metallocene catalyst. The resulting polypropylene is heated, extruded and withdrawn as a sheet. The sheet is then slit longitudinally into tape segments and drawn in the longitudinal direction to a draw ratio of at least about 4.5:1 to produce an oriented tape. It has been found that these polypropylene tapes have different characteristics than those polypropylene tapes produced using Ziegler-Natta catalyst drawn at the same draw ratios.

20 Claims, 4 Drawing Sheets

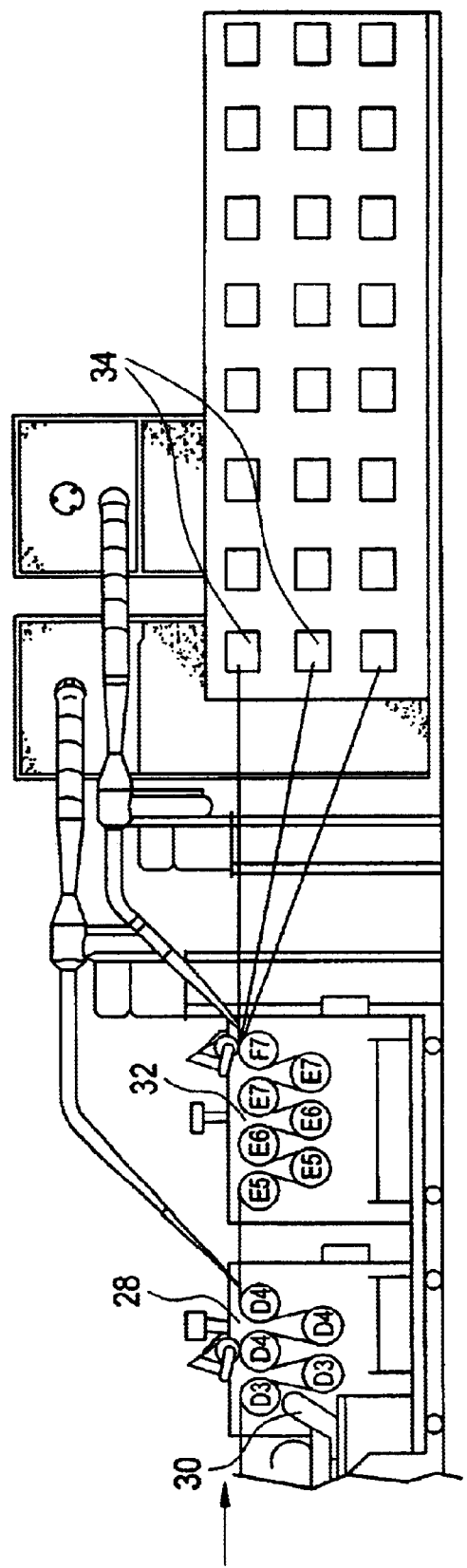

METHOD OF PRODUCING POLYPROPYLENE TAPES

FIELD OF THE INVENTION

This invention relates to polyolefin tapes, and more particularly to the methods used in preparing isotactic polypropylene tapes to effect improvements thereof.

BACKGROUND OF THE INVENTION

The polymers normally employed in the preparation of polypropylene oriented films and tapes are isotactic polymers, although on some occasions the use of syndiotactic polymers has been proposed. Isotactic polypropylene is one of a number of crystalline polymers that can be characterized in terms of the stereoregularity of the polymer chain. Various stereo-specific structural relationships denominated primarily in terms of syndiotacticity and isotacticity may be involved in the formation of stereoregular polymers of various monomers.

Isotactic polypropylene is conventionally used in the production of relatively thin tapes in which the polypropylene is heated and then extruded through dies as a sheet or film that is cut into tape segments and then subjected to orientation by stressing the tape in a longitudinal direction (referred to as the machine direction). The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

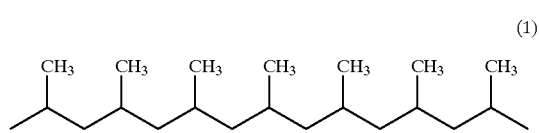

(1)

Another way of describing the structure is through the use of NMR. Bovey's NMR nomenclature for an isotactic pentad is ... mmmm ... with each "m" representing a "meso" dyad, of successive methyl groups on the same side of the plane of the polymer chain. As is known in the art, any deviation or inversion in the structure of the chain lowers the degree of isotacticity and crystallinity of the polymer.

Isotactic polymers are semi-crystalline and are insoluble in xylene. This crystallinity distinguishes isotactic polymers from an atactic polymer, which is non-crystalline and highly soluble in xylene. An atactic polymer exhibits no regular order of repeating unit configurations in the polymer chain and forms essentially a waxy product. In most cases, the preferred polymer configuration for oriented propylene films and tapes will be a predominantly isotactic or syndiotactic polymer with very little atactic polymer.

The isotactic polymers normally employed in the preparation of oriented polypropylene films are usually those prepared through the use of conventional Ziegler-Natta catalysts of the type disclosed, for example, in U.S. Pat. Nos. 4,298,718 and 4,544,717, both to Myer et al. U.S. Pat. No. 5,573,723 to Peiffer et al discloses a process for producing biaxially-oriented polypropylene film based on an isotactic polypropylene homopolymer or propylene/ethylene co-polymers produced by catalysis with such conventional Ziegler-Natta catalysts. Other co-polymers of propylene and alpha-olefins having from 4–8 carbon atoms also may be employed in the Peiffer process.

Catalysts employed in the polymerization of alpha-olefins may be characterized as supported catalysts or unsupported catalysts, sometimes referred to as homogeneous catalysts. Traditional supported catalysts are the so-called "standard" Ziegler-Natta catalysts, such as titanium tetrachloride supported on an active magnesium dichloride as disclosed, for example, in the aforementioned patents to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such as an alkylaluminum compound, for example, triethylaluminum (TEAL). The Myer '717 patent discloses a similar compound that may also incorporate an electron donor compound that may take the form of various amines, phosphenes, esters, aldehydes, and alcohols. Metallocene catalysts are often employed as unsupported or homogeneous catalysts, although, as described below, they also may be employed in supported catalyst components.

Alternative types of catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

(2)

In Formula (2), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

The various metallocene structures as described above can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi. As disclosed there, the metallocene cation is characterized by the cationic metallocene ligand having sterically dissimilar ring structures that are joined to a positively-charged coordinating transition metal atom. The metallocene cation is associated with a stable non-coordinating counter-anion. Similar relationships can be established for isospecific metallocenes.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, zirconia, and the like. Non-metallocene transition metal compounds, such as titanium tetrachloride, are also incorporated into the supported catalyst component. The Welborn '561 patent discloses a heterogeneous catalyst that is formed by the reaction of a metallocene and an alumoxane in combination with the support material. A catalyst system embodying both a homogeneous metallocene component and a heterogeneous component, which may be a standard supported Ziegler-Natta catalyst, e.g. a supported titanium tetrachloride, is disclosed in U.S. Pat. No. 5,242,876 to Shamsoum et al. Various other catalyst systems involving supported metallocene catalysts are disclosed in U.S. Pat. No. 5,308,811 to Suga et al and No. 5,444,134 to Matsumoto.

SUMMARY OF THE INVENTION

A polymer slit film or tape is formed by providing an isotactic propylene polymer prepared by the polymerization of propylene in the presence of an isospecific metallocene catalyst to obtain an isotactice polypropylene. The isotactic polypropylene is heated, extruded in an extruder and withdrawn from the extruder to form a sheet. Pressures within the extruder may be less than about 5000 psi, with a pressure between 2000 to 3500 psi being preferred. At least one tape segment is formed from the sheet. The tape segment is then drawn longitudinally to a draw ratio of at least about 4.5:1. During drawing, the isotactic polypropylene may be maintained at a temperature of between about 250 to 450° F.

It has been found that polypropylene polymer tapes produced with metallocene catalyst that are drawn at draw ratios above 4.5:1, in accordance with the present invention, provide a greater percentage elongation at break and a higher tenacity at maximum elongation than do those polypropylene polymer tapes produced using conventional Ziegler-Natta catalyst for the same given draw ratios. Drawing the isotactic polypropylene at these draw ratios has resulted in polypropylene tapes having a tenacity at maximum elongation of at least about 6 g/denier and an elongation at break of greater than about 12.0%.

BRIEF DESCRIPTION OF THE DRAWINGS

FIG. 1B is a diagram reflecting a later section of the Bouligny process line, which is a continuation of that shown in FIG. 1A.

DETAILED DESCRIPTION OF THE INVENTION

Figure 1A:
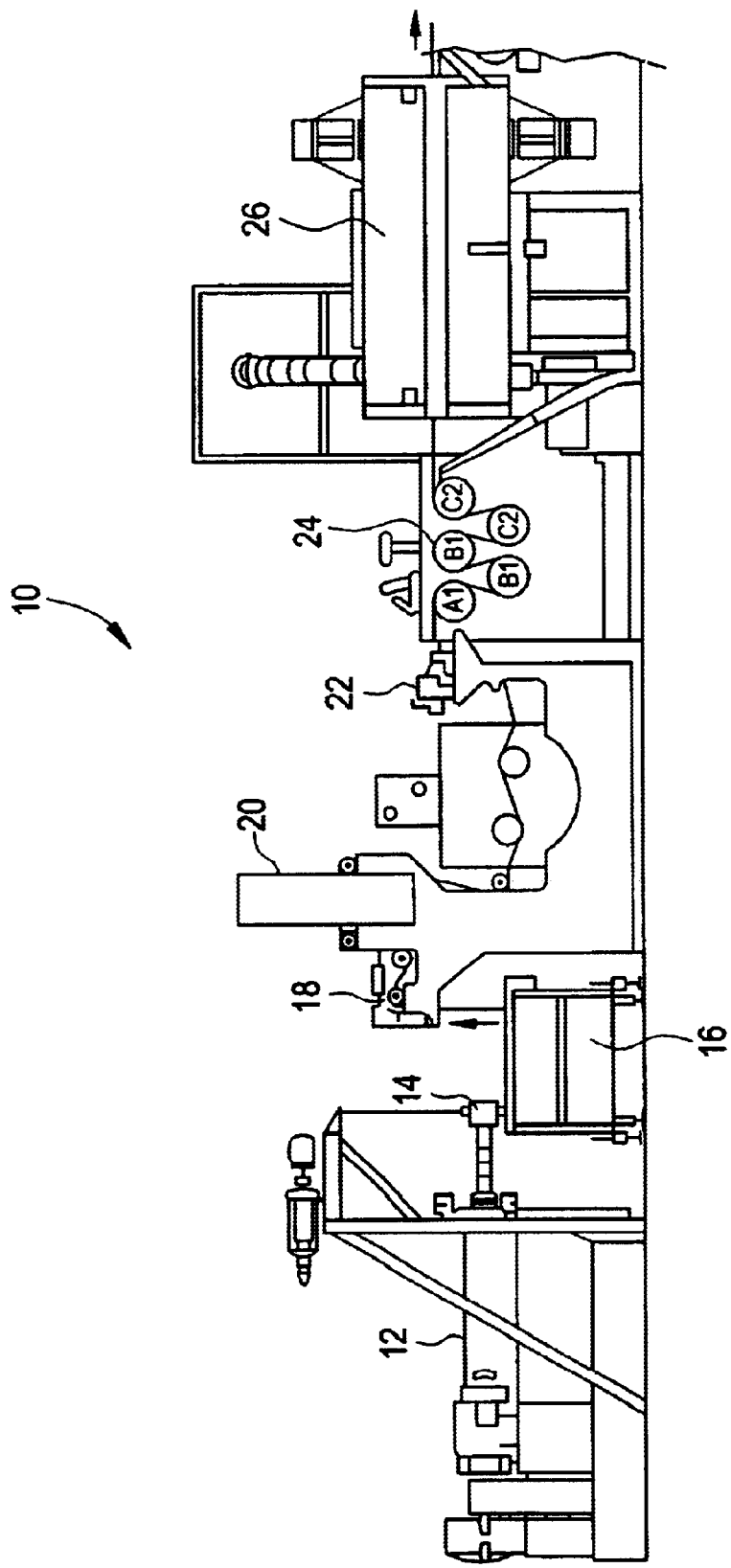
FIG. 1A is a diagram reflecting a front section of an exemplary Bouligny process line for producing oriented slit-film tapes.

The present invention involves the use of isotactic polypropylene polymerized in the presence of metallocene catalysts to make tapes, particularly slit-film tapes with improved processing characteristics. While applicable in most oriented polypropylene tapes where the use of isotactic polypropylene is desired, the present description focuses on use in slit-film processes used to produce oriented tapes.

Polymers used in forming oriented tapes are characterized in terms of certain well-defined characteristics relating to their stereoregular structures and physical properties, including melt temperatures and shrinkage characteristics, as well as in relatively low coefficients of friction and relatively high tensile moduli. The present invention addresses tapes prepared from isotactic polypropylene, preferably as a homopolymer. The isotactic polypropylene is prepared by the polymerization of olefin monomer using an isospecific metallocene, as is discussed below. A further application of the present invention involves the use of isotactic polypropylene as a primary component either in an ethylene-propylene copolymer or in combination with atactic or syndiotactic polypropylene homopolymer. For copolymers of propylene and ethylene, ethylene is usually in an amount ranging up to about 6% by weight ethylene.

The polymerized mixture will often further include minor amounts (typically less than 1 weight percent, and more typically less than 0.5 weight percent) of additives designed to enhance other physical or optical properties. Such mixtures may have, for example, one or more anti-oxidants present in an amount totaling no more than about 0.25 weight percent (in the tested examples no more than about 0.15 weight percent) and one or more acid neutralizers present in an amount totaling no more than about 0.25 weight percent. Although not present in the tested examples, additives acting as "anti-blocking" agents may also be present, again in relatively low percentages such as no more than about 1 weight percent, more preferably no more than about 0.5 weight percent, and even more preferably no more than about 0.25 weight percent.

As discussed, the present invention involves the use of a metallocene catalyst to polymerize propylene, more particularly isotactic polypropylene. Isospecific metallocene catalysts useful in polymerizing isotactic polypropylene and having application to the present invention can be characterized by the following formula:

$$R''(C_5(R')_4)_2MeQ_k \qquad (3)$$

wherein each $(C_5(R')_4)$ is a substituted cyclopentadienyl ring. Each R' is the same or different and is a hydrogen or hydrocarbyl radical having 1–20 carbon atoms. R'' is a structural bridge between the two$(C_5(R')_4)$ rings which are in a racemic configuration relative to Me.

Another more specific formula for the isospecific metallocene catalyst is represented by the formula:

$$R''(Ind)_2MeQ_k \qquad (4)$$

wherein Ind is an indenyl or substituted indenyl group in a racemic configuration. In both Formulas (3) and (4), R'' is a structural bridge extending between the cyclopentadienyl rings. Me is a coordinated transition metal, which may be a Group 4, 5, or 6 transition metal from the Periodic Table of Elements, but preferably is a Group 4 or 5 metal, and more preferably a Group 4 metal, specifically titanium, zirconium, or hafnium. Vanadium is the most suitable of the Group 5 metals. For the present invention, zirconium is the most preferred transition metal in that position. Q is an alkyl or other hydrocarbyl radical having 1–20 carbon atoms or a halo group, and k is a number from 0 to 3.

U.S. Pat. No. 4,794,096 discloses various structures R" for the structural bridge. R" is a stable component that bridges the two ($C_5(R')_4$) rings in order to render the catalyst stereorigid. R" may be organic or inorganic and may include groups depending from the portion acting as a bridge. Examples of R" include an alkylene radical having 1–4 carbon atoms, a silicon hydrocarbyl group, a germanium hydrocarbyl group, an alkyl phosphine, an alkyl amine, boron, nitrogen, sulfur, phosphorous, aluminum or groups containing these elements. The preferred R" components are methylene, ethylene, a dialkyl silyl, and a cycloalkyl silyl such as cyclopropyl silyl, among others. For the present invention, a suitable silicon bridge is dimethyl silyl. The metallocene or mixtures of two or more metallocenes may be supported on a particulate catalyst support. Published European patent application EP 0856,525, which is herein incorporated by reference, describes a suitable method of providing a supported metallocene catalyst. The metallocene or metallocene mixture catalyst systems employed in the present invention are used in combination with an alumoxane co-catalyst as will be well understood by those skilled in the art. Normally, methylalumoxane will be employed as a co-catalyst, but various other alumoxanes, such as ethylalumoxane and isobutylalumoxane, may be employed in lieu of or in conjunction with methylalumoxane. The use of such co-catalysts in metallocene-based catalyst systems are well-known in the art, as disclosed, for example, in U.S. Pat. No. 4,975,403 to Ewen, the entire disclosure of which is incorporated herein by reference. So-called alkylaluminum co-catalysts or scavengers are also normally employed in combination with the metallocene alumoxane catalyst systems. Suitable alkylaluminum or alkylaluminum halides include trimethylaluminum, triethylaluminum (TEAL), tri-isobutylaluminum (TIBAL), and tri-n-octylaluminum (TNOAL). Mixtures of such co-catalysts may also be employed in carrying out the present invention. While trialkylaluminums will usually be used as scavengers, it is to be recognized that alkylaluminum halides, such as diethylaluminum chloride, diethylaluminum bromide, and dimethylaluminum chloride, or dimethylaluminum bromide, may also be used in the practice of the present invention.

In general, slit-film production can be of any suitable technique, such as those disclosed in U.S. Pat. No. 4,129,632 to Olson et al. As described in the Olson et al. U.S. Pat. No. 4,129,632, the entire disclosure of which is incorporated herein by reference, the polymer or polymers used to make the film are melted and then passed through an extruder to a slot die mechanism after which it is either passed through a quench tank, or passed over a first roller, characterized as a chill roller, either of which tends to solidify the film. This cooling or quenching is typically used to cool the extruded polymer to a suitable temperature within the range of about 75 to 120° F. The timing of the extrusion and cooling or quenching process is in part governed by the "take-away" speed at which the first exterior roller is withdrawing the film or sheet from the extruder through the cooling or quenching section. There is also commonly a relaxation of 5%–25% allowed for between the take-away roller (or rollers) and the first drawing rollers (which travel 5% to 25% faster, allowing the film to relax and expand slightly without sagging or becoming loose). The film is slit after extrusion and quenching into longitudinal segments. This may be accomplished by any number of slitting methods known in the art, including those disclosed in Olson et al. The film is slit into tape segments having widths that account for the subsequent orientation, wherein the widths of the tapes are reduced further. Typical tape widths prior to drawing may be between 0.3 to 1.0 centimeter.

The tape segments are then oriented by drawing in a longitudinal direction, typically under heated conditions, to arrive at tape segments which can be characterized in terms of orientation ratio, sometimes also referred to as draw or stretch ratio. Unless otherwise specified, all references to "draw," "draw ratio," "stretch," or "stretch ratio" refer to the stretching or drawing of the polypropylene tape in the longitudinal or machine direction. The longitudinal or machine direction orientation may be accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the tapes have been stressed in the machine direction, it may be heated on an annealing roll to reduce later shrinkage. In stretching the tape in the machine direction, it is heated by heated rollers or an oven within the temperature range of from about 250 to 450° F., with an incremental temperature increase of about 140–210° F. During drawing, the slow roller (typically referred to as Godet 1) may be operated at any suitable speed, usually about 10 to 60 meters per minute in a production line. The fast roller (typically referred to as Godet 2) is operated at a suitable speed, typically approaching 120 to 360 meters per minute in a production line, to provide a surface speed at the circumference of about three or more times that of the slow roller in order to orient the tape in the machine direction. The oriented tapes may be from 200 to 5000 denier, with 750 to 1250 denier being preferred in most applications.

The slit tapes may then be intentionally fibrillated if desired, and in any event, are typically wound up onto bobbins or rolls, either separately or twined in some fashion.

FIGS. 1A and 1B show a Bouligny slit film process line 10 that may be used in forming the oriented tapes of the invention. The process line 10 is provided with an extruder 12 where the polypropylene is extruded at high temperature and pressure into a thin sheet or film through a die head 14. The extruded sheet is immediately passed to a quench tank 16 where it is taken up by take-away rolls 18. It should be noted that some orientation or drawing may occur during these initial stages as tension is applied to the extruded film by the take-away rolls. A thickness gage 20 is provided downstream to measure any variations of thickness in the film to ensure uniform film thickness. The film is eventually passed to a cutter 22 where the film is slit longitudinally into a plurality of tape segments, which are then passed through a series of rollers 24. The rollers 24 may be heated to provide preheating prior to orientation. The rollers 24 may each be operated at different speeds to provide tension and some initial stretching of the tape. The tape segments are stretched or drawn primarily within the oven or heating section 26 as they are passed from the last roller or godet in the series 24 to the initial roller or godet of roller series 28 (FIG. 1B) located downstream from the oven 26. The rollers of roller series 28 may be heated or cooled to provide annealing of the oriented tape segments. Each roller may be heated or cooled to a selected temperature to provide a gradual temperature decrease. A fibrillator 30 may optionally be used to fibrillate the oriented tapes as they are passed through the roller series 28. The tapes pass downstream from the roller series 28 to another roller series 32, which may also be heated or cooled if desired. The individual oriented tapes are then passed from the roller series 32 to individual winders or take-up reels 34, which can be periodically removed and replaced as they are filled.

The following example illustrates the unexpected advantages in processing and the potential advantage in shrinkage provided by the present invention. The example also provides an illustration of the effects of the present invention on other physical and process properties. It has been found that isotactic propylene polymer tapes prepared using metallocene catalyst that were produced at particular take-away speeds showed improvements in certain processing conditions, such as extruder pressure, and in the resulting polymer tape. In the present invention, the rollers are operated at speeds to produce draw ratios of greater than at least 4.5:1, with draw ratios ranging between about 4.5:1 to 12:1 being preferred.

EXAMPLE 1

Homopolymer resins of isotactic polypropylene were processed through a Bouligny slit-film line using different draw ratios and the resulting properties then measured. One of the resins was an isotactic polypropylene that had been prepared using a metallocene catalyst. The other resin was an isotactic polypropylene prepared using a Ziegler-Natta catalyst. Both polymer resins were then processed using the same production line.

The trial was conducted in a Bouligny slit film line where the screw speed of the extruder was adjusted to maintain approximately a 1,000 denier tape. The air gap was 12.7 millimeters, while the die gap was 0.38 millimeters. The extrusion temperature was approximately 250° C. The quench tank was maintained at about 38° C. The take away speeds were run alternatively at about 21 meters per minute in each run. The Godet 1 speed was at 23 meters per minute providing a relaxation of 3% from the take away speed, which was at 21 meters per minute. Prior to drawing, the film was slit along its longitudinal (machine-direction) axis into individual tape segments (also called individual film segments or individual tapes) with widths of approximately ¼ inch. The tapes were run through a stretching oven, which was maintained at about 170° C., while annealing rolls were run at about 143° C. The tape was oriented in the longitudinal or machine direction with different draw ratios of between about 5:1 to 11:1. The polypropylene was maintained at a temperature of about 338° F. The tapes were then physically tested using an Instron Universal Testing Machine.

With respect to the polymer resins used, Sample 1 was generated by the polymerization of propylene over a metallocene catalyst composed of a mixture of dimethylsilyl bis(2-methyl-4-phenyl indenyl) zirconium dichloride and dimethylsilyl bis(2-methyl indenyl) zirconium dichloride. Sample 1 had a measured melt flow index of 4.7 g/10 min with a xylene solubles content of 0.3%. Sample 2 was generated using basically the Ziegler-Natta catalyst. Sample 2 had a measured melt flow index of 4.9 g/10 mins with a xylene solubles percentage of 1.5.

Figure 2:
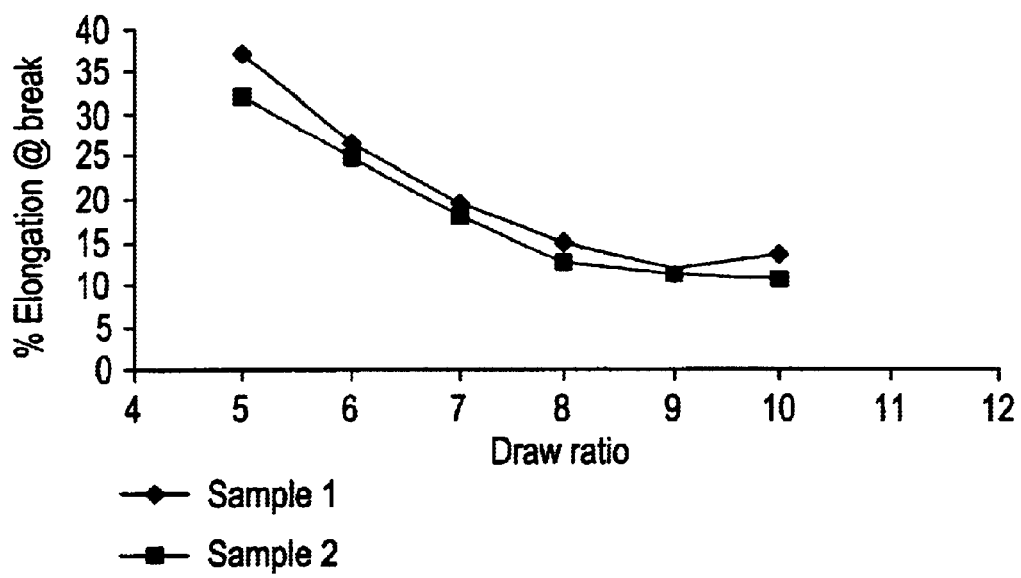
FIG. 2 is a graph showing the percentage of elongation at break plotted on the ordinate versus the draw ratio plotted on the abcissa for polymer tapes produced with both metallocen and Ziegler-Natta catalysts.

It was generally observed, as shown in FIG. 2, that the metallocene polypropylene tape of Sample 1 had a higher elongation at break for all draw ratios compared to the polypropylene tape of Sample 2, which was prepared with the Ziegler-Natta catalyst. The lowest elongation at break measured for the metallocene polypropylene tape was about 12.0% (FIG. 2) at a draw ratio of 9:1. Elongation at break up to as high as about 36.9% (draw ratio 5:1) were also recorded. Similar results were achieved for the metallocene polypropylene processed in another production line utilizing draw ratios of between 6:1 to 11:1.

Figure 3:
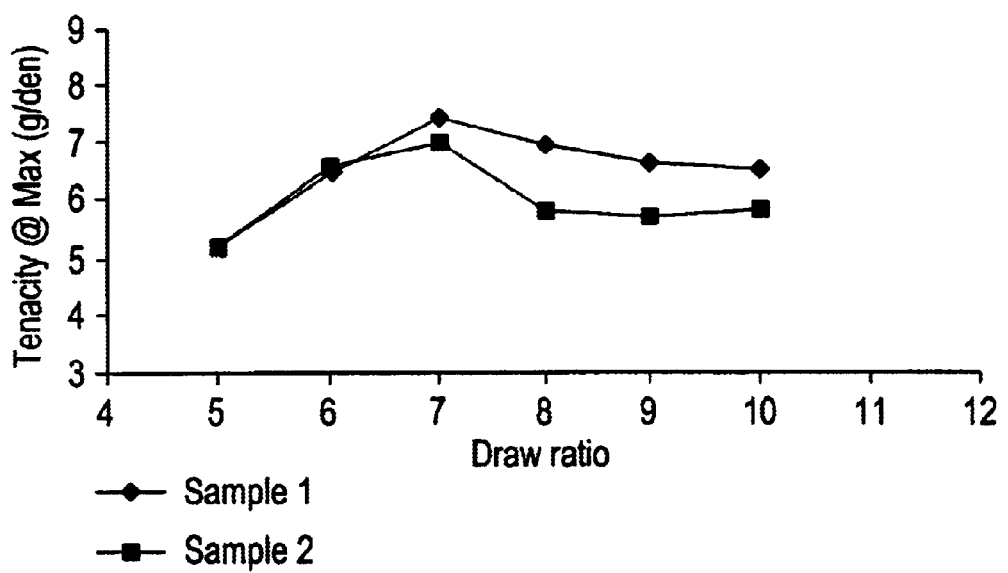
FIG. 3 is a graph showing the tenacity at maximum elongation plotted on the ordinate versus the draw ratio plotted on the abcissa for polymer tapes produced with both metallocene and Ziegler-Natta catalysts.
Figure 4:
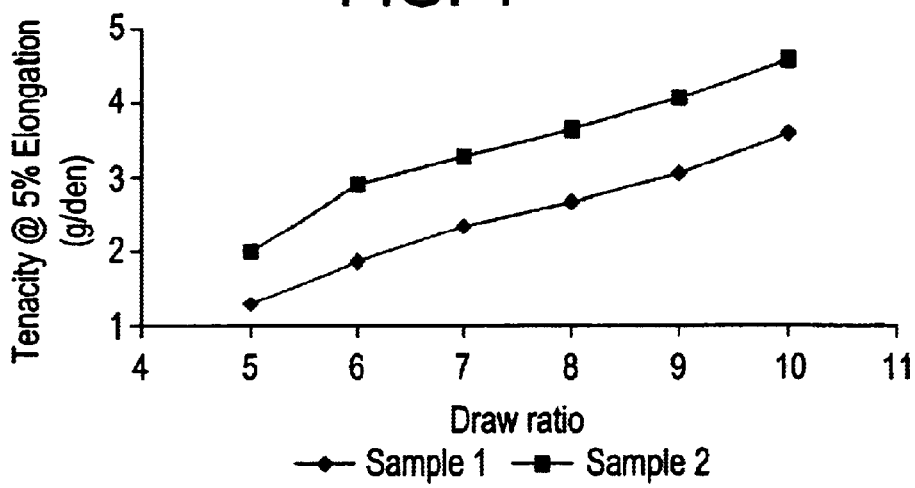
FIG. 4 is a graph showing the tenacity at 5% elongation plotted on the ordinate versus the draw ratio plotted on the abcissa for polymer tapes produced with both metallocene and Ziegler-Natta catalysts.
Figure 5:
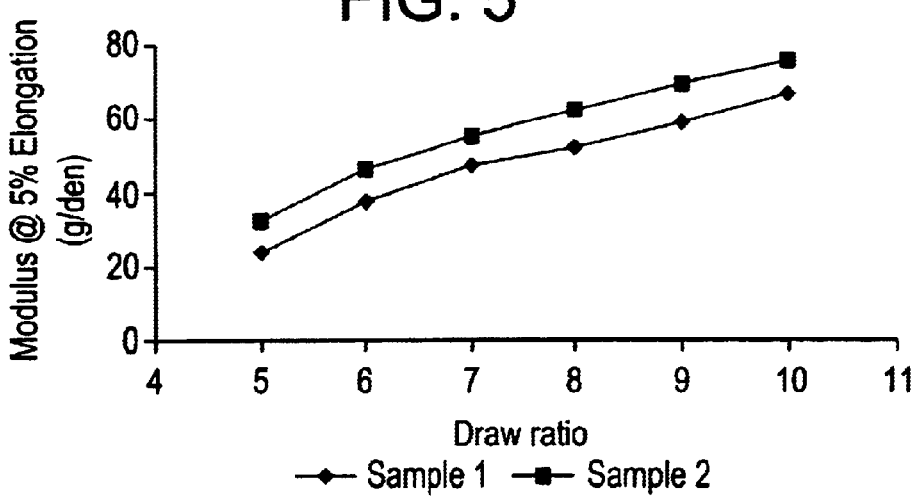
FIG. 5 is a graph showing the modulus at 5% elongation plotted on the ordinate versus the draw ratio plotted on the abcissa for polymer tapes produced with both metallocene and Ziegler-Natta catalysts.

A fairly large difference in the tenacities of the two materials resulted at draw ratios greater than 7:1, with no drop off at these higher ratios. As shown in FIG. 3, the tenacity at maximum is slightly higher for the polypropylene of Sample 1 compared to the Ziegler-Natta polypropylene of Sample 2 at the same draw ratios, particularly at draw ratios above 8:1. This is particularly unexpected in view of the fact that the tenacity and modulus at relatively low elongations are substantially higher for the polypropylene tape based upon Ziegler-Natta catalyst than the tapes based upon metallocene catalysts. It is noted, that the tenacity and modulus at low extensions are considerably higher for the Ziegler-Natta sample, as shown in FIGS. 4 and 5. In no case did the tenacity at maximum elongation drop below 6 g/den for the polypropylene tape of the metallocene sample.

Figure 6:
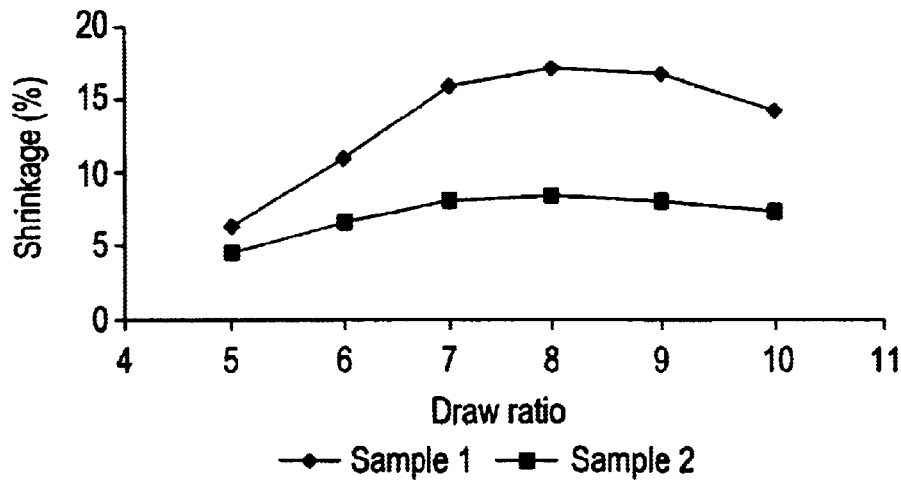
FIG. 6 is graph showing the percentage of shrinkage plotted on the ordinate versus the draw ratio plotted on the abcissa for polymer tapes produced with both metallocene and Ziegler-Natta catalysts.

FIG. 6 shows the shrinkage data for the two polymers. At lower draw ratios, the shrinkage for both materials are closer together, but the differences increase at draw ratios higher than 6:1, with the shrinkage for metallocene being greater. This is probably due to the presence of more amorphous orientation in the metallocene isotactic polypropylene, which are quick to relax at an elevated temperature. It is theorized that the higher molecular weight molecules in the Ziegler-Natta isotactic polypropylene, such as that of Sample 2, may act as tie molecules, which may interfere with the shrinkage.

In summary, with respect to oriented tape production, particularly slit-film lines, the preferred draw ratio for use with the present invention is at least 4.5:1. At these higher draw ratios, isotactic polypropylene polymer tapes prepared using metallocene catalyst show a higher elongation at break than those prepared using Ziegler-Natta catalyst. At draw ratios of greater than at least 6:1, a significant difference in the shrinkage of the polymer tapes was observed. At draw ratios of greater than at least 7:1, a fairly large difference in the tenacities at maximum elongation of the two materials resulted.

In a particular preferred embodiment of the invention, the process includes drawing the tape to a draw ratio of at least 5:1 to produce a tenacity at maximum elongation of at least about 6 grams per denier. In yet another aspect of the invention, the tape is drawn to produce an elongation at break of greater than about 12.0%. In another aspect of the invention, the above process is used to produce slit-film tapes, where each of said plurality of individual tape segments each have a width within the range of 0.1 to 3 cm.

Having described specific embodiments of the present invention, it will be understood that modifications thereof may be suggested to those skilled in the art, and it is intended to cover all such modifications as fall within the scope of the appended claims.

We claim:

1. A process for making a polymer tape comprising:
providing an isotactic propylene polymer prepared by the polymerization of propylene in the presence of an isospecific metallocene catalyst to obtain isotactic polypropylene;
heating the isotactic polypropylene;
extruding said isotactic polypropylene in an extruder;

withdrawing the extruded isotactic polypropylene from the extruder to form a sheet;

forming at least one tape segment from the sheet; and drawing the isotactic polypropylene tape segment in at least one direction to a draw ratio of at least about 4.5:1.

2. The process of claim 1, wherein the draw ratio is at least about 6:1.

3. The process of claim 1, wherein the draw ratio is at least about 7:1.

4. The process of claim 1, wherein the isotactic polypropylene is maintained at a temperature of between about 250 to 450° F. during drawing.

5. The process of claim 1, wherein the draw ratio is within a range of about 4.5:1 to about 12:1.

6. The process of claim 1, wherein withdrawing the polymer occurs at a speed of at least about 18 m/min.

7. The process of claim 1, wherein the isotactic polypropylene is extruded in an extruder with an extruder pressure of less than about 5000 psi.

8. The process of claim 1, wherein the isotactic polypropylene polymer is extruded in an extruder with an extruder pressure from about 2000 to about 3500 psi.

9. The process of claim 1, wherein the isospecific metallocene of the metallocene catalyst is characterized by the formula:

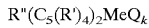

wherein each $(C_5(R')_4)$ is a substituted cyclopentadienyl ring; each R' is the same or different and is a hydrogen or hydrocarbyl radical having 1–20 carbon atoms; R" is a structural bridge between the two $(C_5(R')_4)$ rings being in a racemic configuration relative to Me, and R" is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and aluminum hydrocarbyl radical; Me is a group 4, 5 or 6 transition metal as designated in the Periodic Table of Elements; each Q is a hydrocarbyl radical having 1–20 carbon atoms or is a halogen; and $0 \leq k \leq 3$.

10. The process of claim 1, wherein the isotactic polypropylene sheet is cut longitudinally into a plurality of tape segments.

11. The process of claim 1, wherein each of the tape segments has a width within the range of about 0.1 cm to about 3 cm.

12. The process of claim 1, wherein the isotactic polymer tape is drawn to a thickness of from about 200 to 5000 denier.

13. The process of claim 1, wherein the polypropylene tape segment is drawn in the longitudinal direction.

14. The process of claim 1, wherein drawing the isotactic polypropylene tape segment in the at least one direction obtains a polypropylene tape having a tenacity at maximum elongation of at least about 6 g/denier.

15. The process of claim 1, wherein drawing the isotactic polypropylene tape segment in the at least one direction obtains a polypropylene tape having an elongation at break of greater than about 12%.

16. A process for making a polymer film comprising:

providing an isotactic propylene polymer prepared by the polymerization of propylene in the presence of an isospecific metallocene catalyst to obtain isotactic polypropylene;

heating the isotactic polypropylene;

extruding said isotactic polypropylene in an extruder with an extruder pressure of less than about 5000 psi;

withdrawing the extruded isotactic polypropylene from the extruder to form a sheet;

forming at least one tape segment from the sheet; and drawing the isotactic polypropylene tape segment in the longitudinal direction at a temperature from about 250 to 450° F. to a draw ratio of at least about 4.5:1.

17. The process of claim 16, wherein the draw ratio is at between about 5:1 to 12:1.

18. The process of claim 16, wherein the tape segment is drawn to a thickness ranging from about 200 to 5000 denier.

19. The process of claim 16, wherein the isotactic polypropylene sheet is cut longitudinally into a plurality of individual tape segments, each having a width within the range of about 0.1 cm to about 3 cm.

20. The process of claim 16, wherein drawing the tape segment provides a polypropylene tape having a tenacity at maximum elongation of at least about 6 g/denier and an elongation at break of greater than about 12%.

* * * * *